Patented Dec. 5, 1950

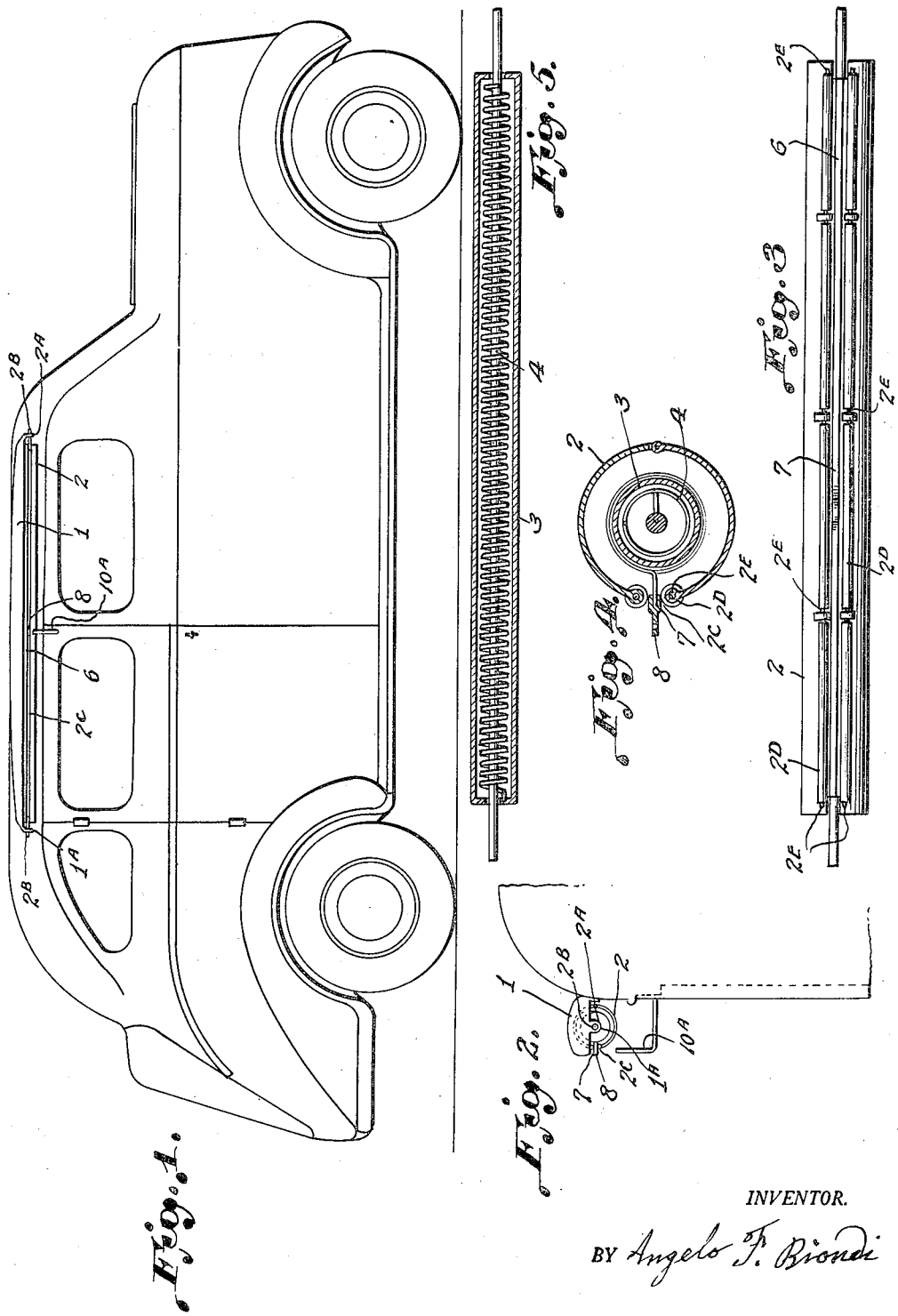

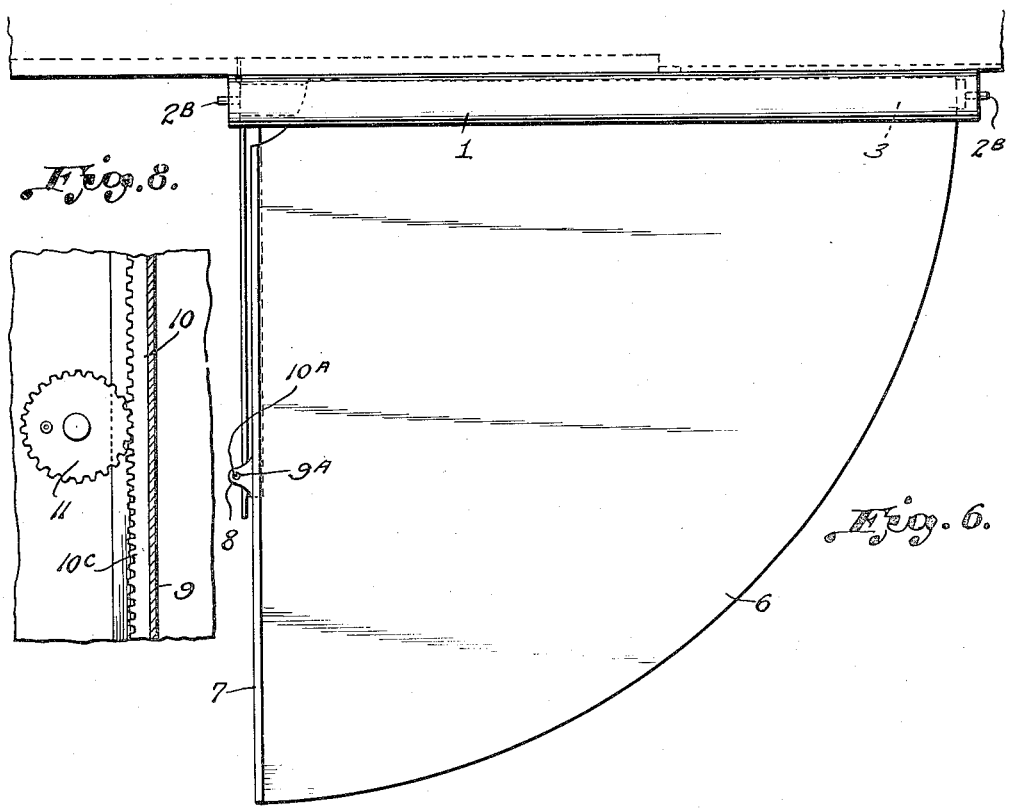
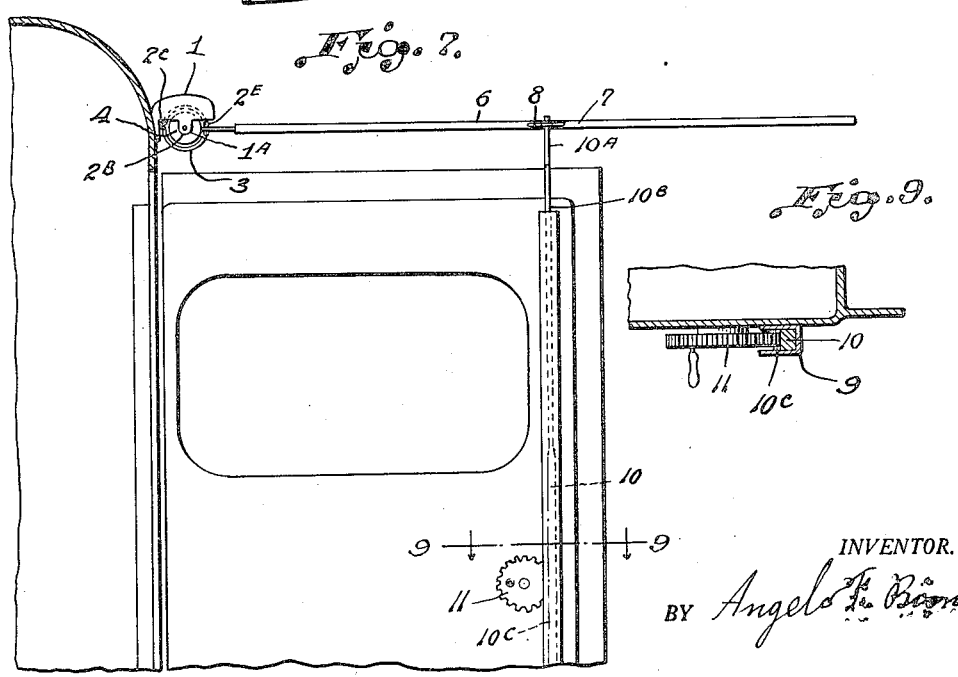

2,532,989

UNITED STATES PATENT OFFICE 2,532,989

AUTOMOBILE DOOR COVER

Angelo F. Biondi, Brooklyn, N. Y.

Application October 5, 1948, Serial No. 52,947

3 Claims. (Cl. 160—92)

1

This invention relates to a cover for automobiles adapted to be automatically drawn by the door as it is opened.

It is an object of the present invention to provide an automatic cover adapted to be drawn by the door of the automobile as it is opened to cover the passenger as he departs from the automobile and to keep him from getting wet when getting out of the vehicle and when it is raining.

It is another object of the present invention to provide a cover adapted to be pulled out as an automobile door is opened wherein there is provided a simple connecting device to attach the cover to the door at the will of the passenger so that the cover need not be used at times when it is not raining, but when it is desired to use the same, the passenger can, by the simple turning of a wheel, make the connection of the door with the cover so that it will be pulled as the door is opened.

For other objects and for a better understanding of the invention, reference may be had to the following detailed description taken in connection with the accompanying drawing, in which Fig. 1 is a side elevational view of an automobile employing the cover structure of the present invention.

Fig. 2 is an end elevational view of the cover structure and of the extension of the rod for fixing the cover structure to the door.

Fig. 3 is a front elevational view of the cover structure.

Fig. 4 is a transverse sectional view of the cover structure.

Fig. 5 is an elongated sectional view of the spring roller.

Fig. 6 is a top plan view showing the cover structure extended by the door.

Fig. 7 is a view looking upon the inner side of the door and with the cover structure extended, the connection being effected between the door and the cover structure to pull the same out as the door swings to an open position.

Fig. 8 is an enlarged sectional view showing the operating mechanism for raising the rod which connects with the cover structure.

Fig. 9 is a fragmentary transverse sectional view taken on line 9—9 of Fig. 7.

Referring now to the figures, I represents a shield or cover made out of wood, plastic, metal or any other suitable material and extending horizontally along the side of the top of the vehicle and firmly secured thereto by screws or any other suitable means. The shield I is provided at both ends with sockets 1a, 1a in which

2 are fastened the end projections 2b, 2b of a tube casing 2.

This tube casing 2 has an opening or a slot 2c extending throughout its entire length, the sides of which 2d, 2d being provided with revolving rods 2e, 2e to facilitate the movement of a waterproof cover sheet 6 in and out of the tube casing 2.

Inside of the tube casing 2 is a spring roller 3 having a spring 4 adjusted to the proper tension to provide the necessary rotation of the cylinder 3 when the sheet or cover strip 6, connected to the roller, is to be returned from its pulled out position. The cover sheet is of adequate length and width, made with any suitable fabric material, preferably waterproof, one end of which is firmly attached to the cylinder roller 3, while the other end is attached to a stick 7 to keep the width of the sheet 6 always stretched and to prevent the material from becoming inaccessible upon being wound upon the roller 3. A tab 8 is attached to the stick intermediate its length thereof and has an opening 9a thereon.

On the inner face of the door is a channel 9 which extends vertically. Operable in this channel is a rod 10 having an outwardly and upwardly bent projection 10a adapted to register with an opening 9a in the tab 8 of the cover stick. The rod has rack teeth 10c thereon which are engaged by a pinion 11 that can be turned to effect the vertical adjustment of the rod upwardly to make the engagement of the end 10a with the cover tab or to release the same therefrom. On days when the cover is to be used, the pinion 11 will be turned to raise the rod to effect the engagement with the cover so that each time the door is opened the cover will be pulled out. As the door is closed, the spring roller will return the cover to the tube casing. If the rod is disengaged from the cover, the door can be opened free of the cover.

While various changes may be made in the detail construction, it shall be understood that such changes shall be within the spirit and scope of the present invention as defined by the appended claims.

Having thus set forth and disclosed the nature of my invention, what is claimed is:

1. In combination, an automobile having a top portion, a door at the side of the automobile under the top portion, an extendable cover structure connected to the side of the top portion over the door, said cover structure including a cover adapted to be pulled out, and means extending from the door to the cover to effect the pulling out of the cover as the door is opened, and spring roller means for returning the cover as the door is closed.

2. In combination, an automobile having a top portion, a side door, a cover structure connected to the side of the top portion, said cover structure having a spring roller, a cover adapted to be pulled from the spring roller, and releasable means adapted to extend between the door and the cover whereby to automatically pull the cover as the door is opened.

3. In combination, an automobile having a top portion, a door at the side of the automobile under the top portion, an extendable cover structure connected to the side of the top portion over the door, said cover structure including a cover adapted to be pulled out, and releasable means extending from the door to the cover to effect the pulling out of the cover as the door is opened, and spring roller means for returning the cover as the door is closed, said releasable means comprising a vertically extending channel, a rod adjustable in the channel, said rod being outwardly bent at its upper end, said cover having a slot for receiving the upwardly bent end of the rod, said rod having rack teeth, a pinion rotatable upon the door and engaging with said rack teeth whereby the rod can be either lowered to disconnect the rod from the cover or elevated to effect the connection of the rod with the opening in the cover.

ANGELO F. BIONDI.

REFERENCES CITED

The following references are of record in the file of this patent:

UNITED STATES PATENTS

| Number | Name | Date |
|---|---|---|
| 1,566,356 | Veglia | Dec. 22, 1925 |
| 1,584,553 | Killip | May 11, 1926 |
| 1,659,825 | MacKay | Feb. 21, 1928 |
| 2,311,413 | Persson | Feb. 16, 1943 |
| 2,316,510 | Ferris | Apr. 13, 1943 |